Nov. 25, 1947. T. HINDLE 2,431,642
PICKING MECHANISM OF LOOMS FOR WEAVING
Filed Nov. 14, 1945 11 Sheets-Sheet 1

INVENTOR
Thomas Hindle
By Marvin L. Peterson
ATTORNEYS

Nov. 25, 1947.  T. HINDLE  2,431,642
PICKING MECHANISM OF LOOMS FOR WEAVING
Filed Nov. 14, 1945  11 Sheets-Sheet 2

INVENTOR
Thomas Hindle
By Norris C Bateman
ATTORNEYS

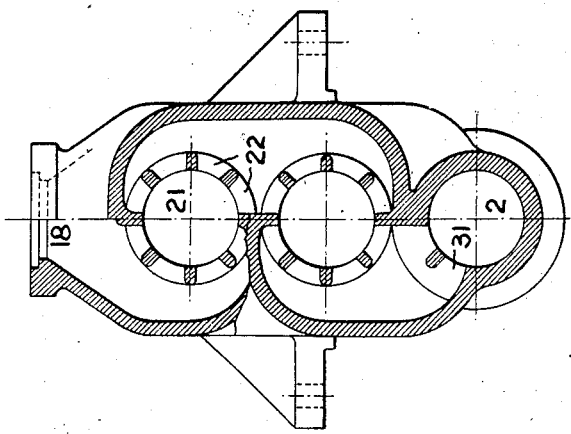
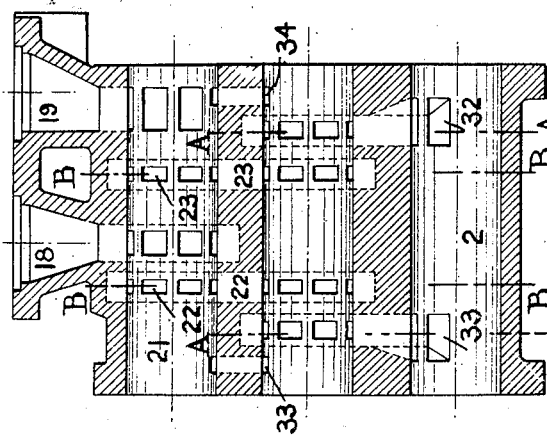
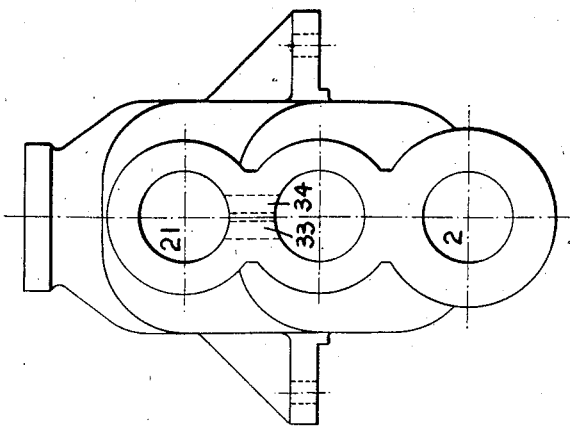
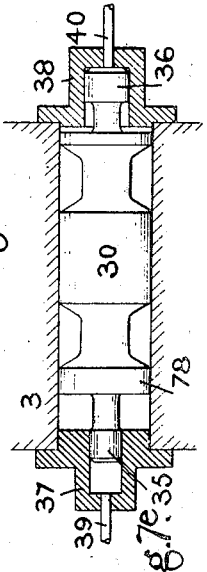
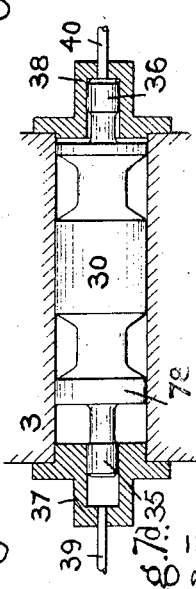

Nov. 25, 1947.  T. HINDLE  2,431,642
PICKING MECHANISM OF LOOMS FOR WEAVING
Filed Nov. 14, 1945   11 Sheets-Sheet 6

INVENTOR
ATTORNEYS

Nov. 25, 1947.  T. HINDLE  2,431,642
PICKING MECHANISM OF LOOMS FOR WEAVING
Filed Nov. 14, 1945  11 Sheets-Sheet 7
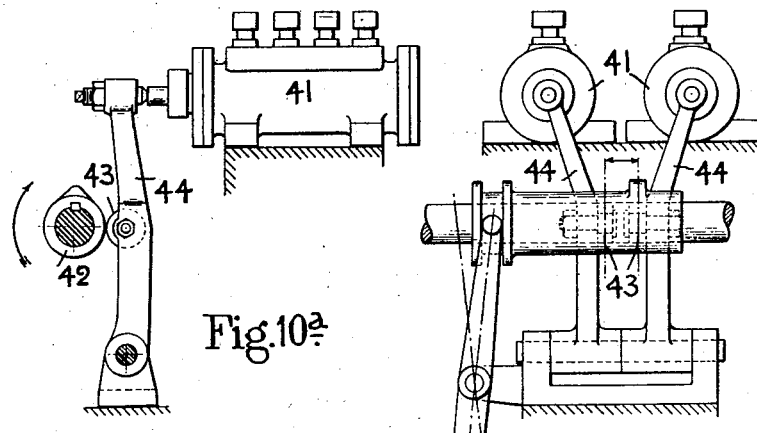
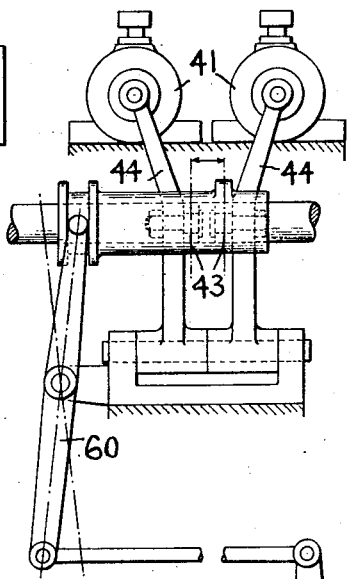
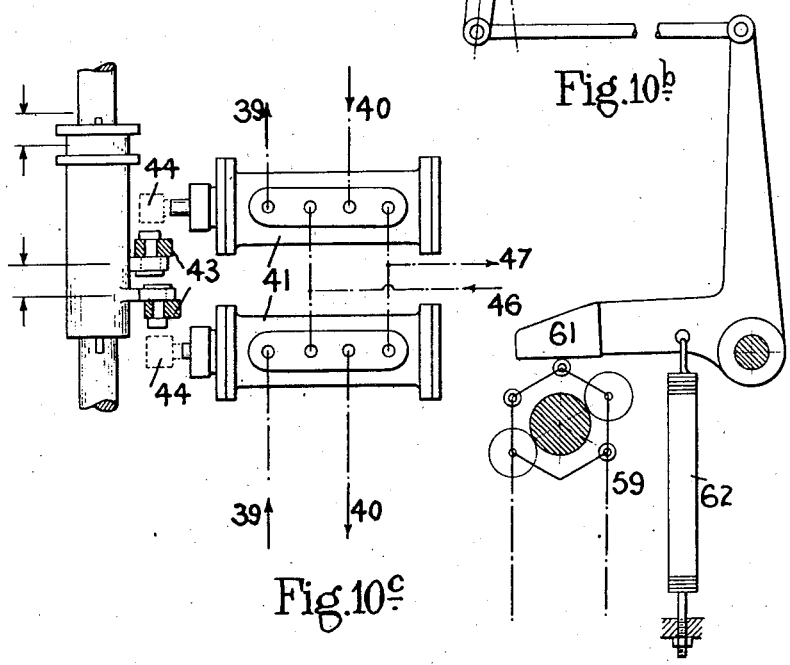
INVENTOR
Thomas Hindle
ATTORNEYS

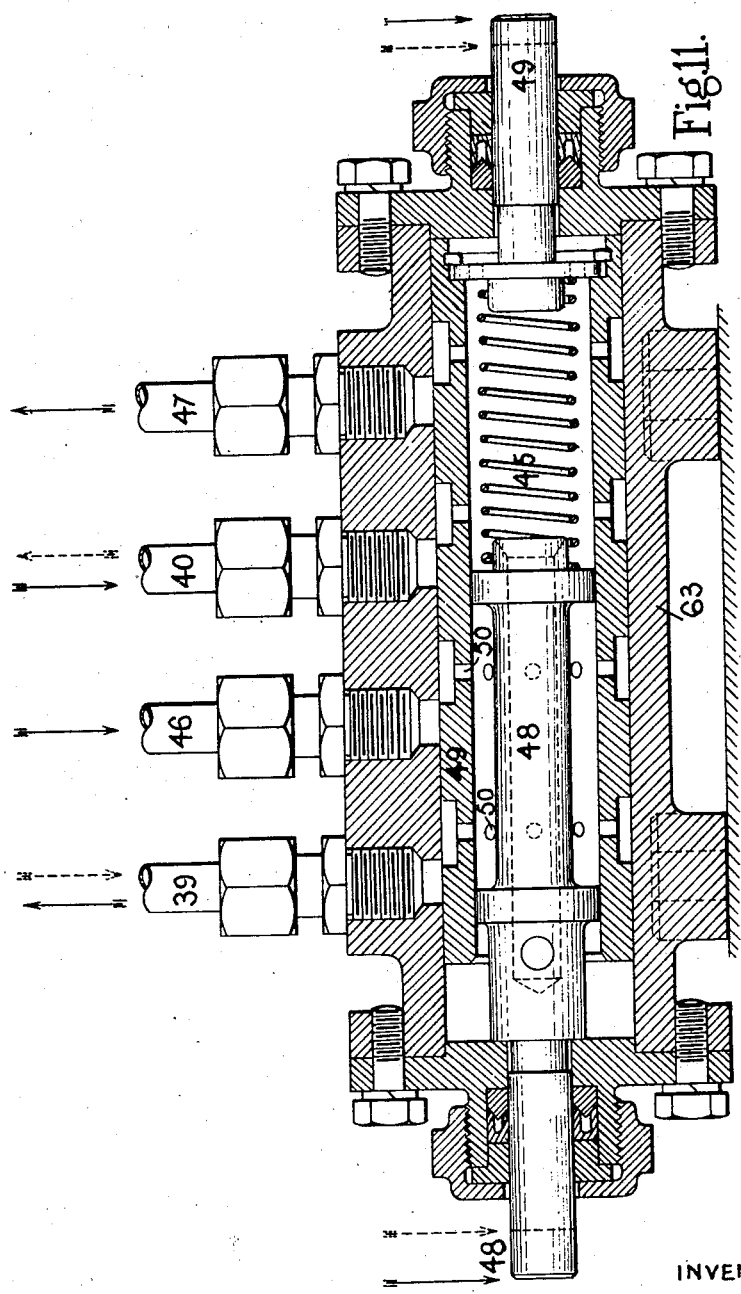

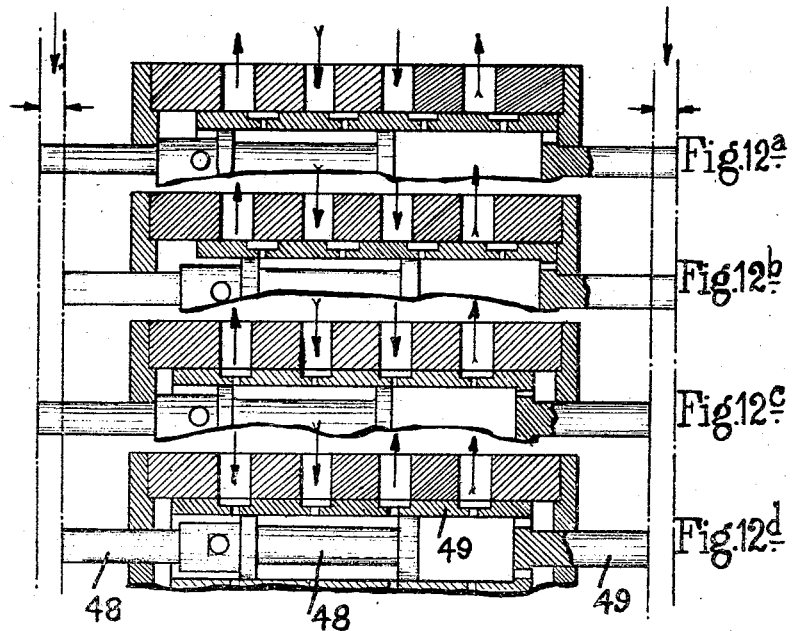
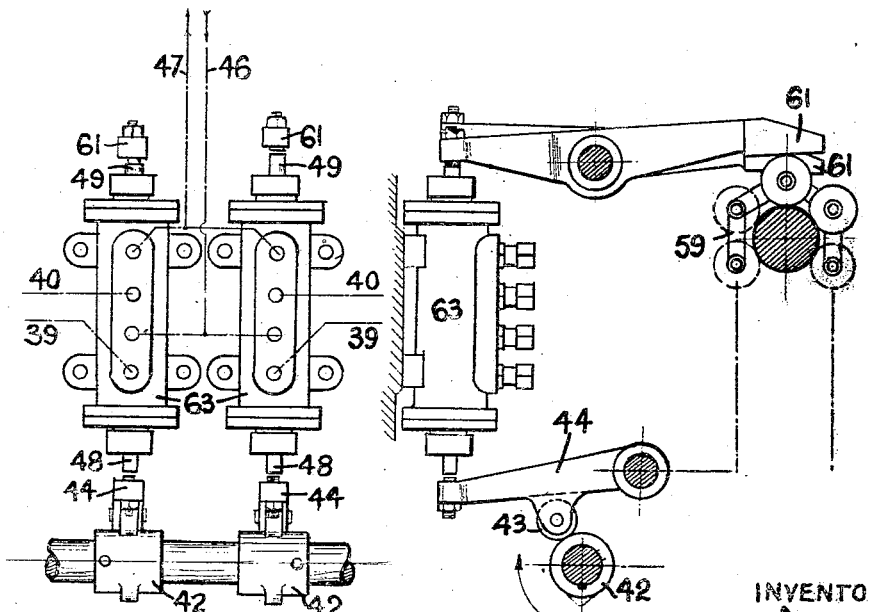

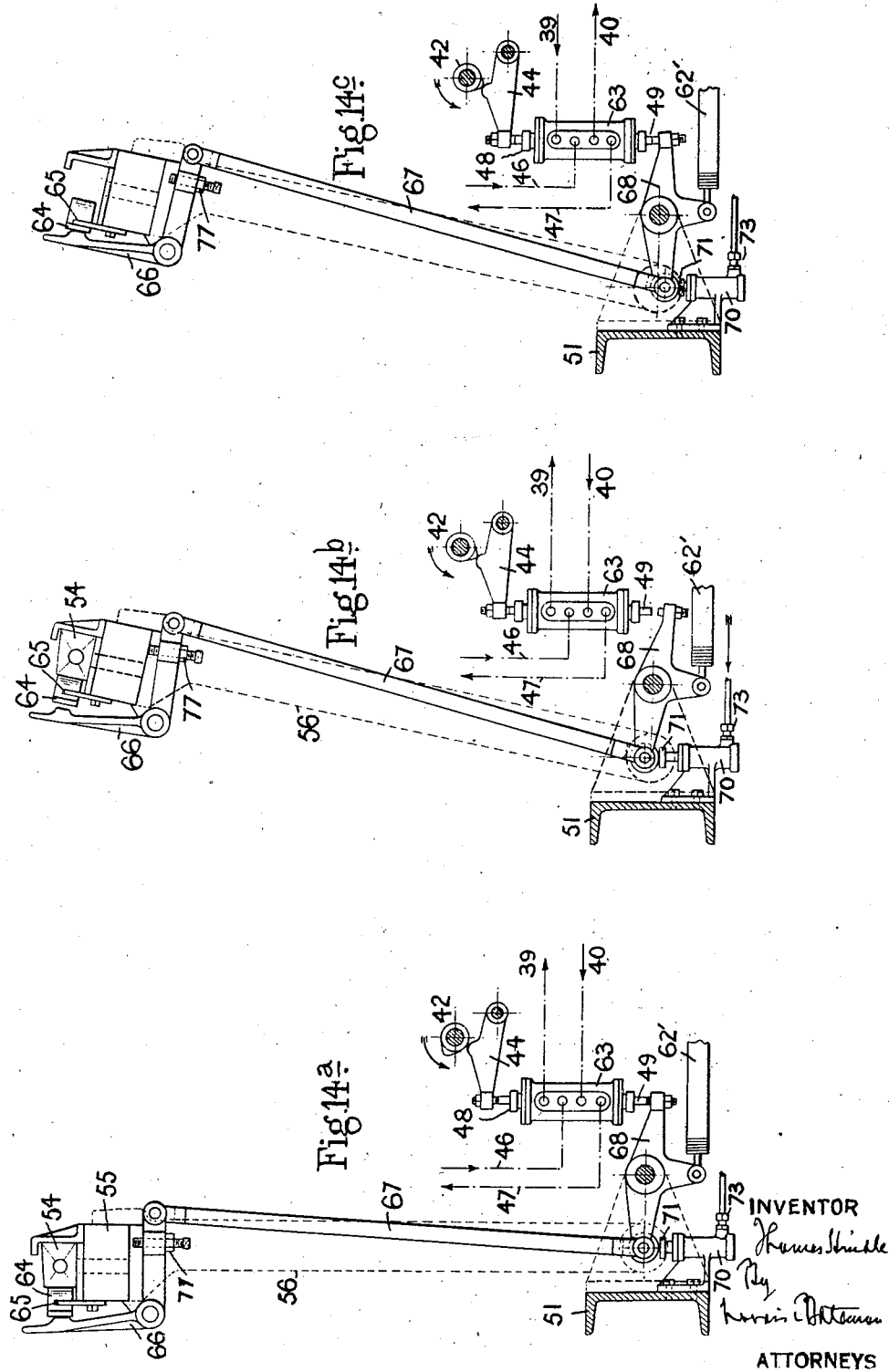

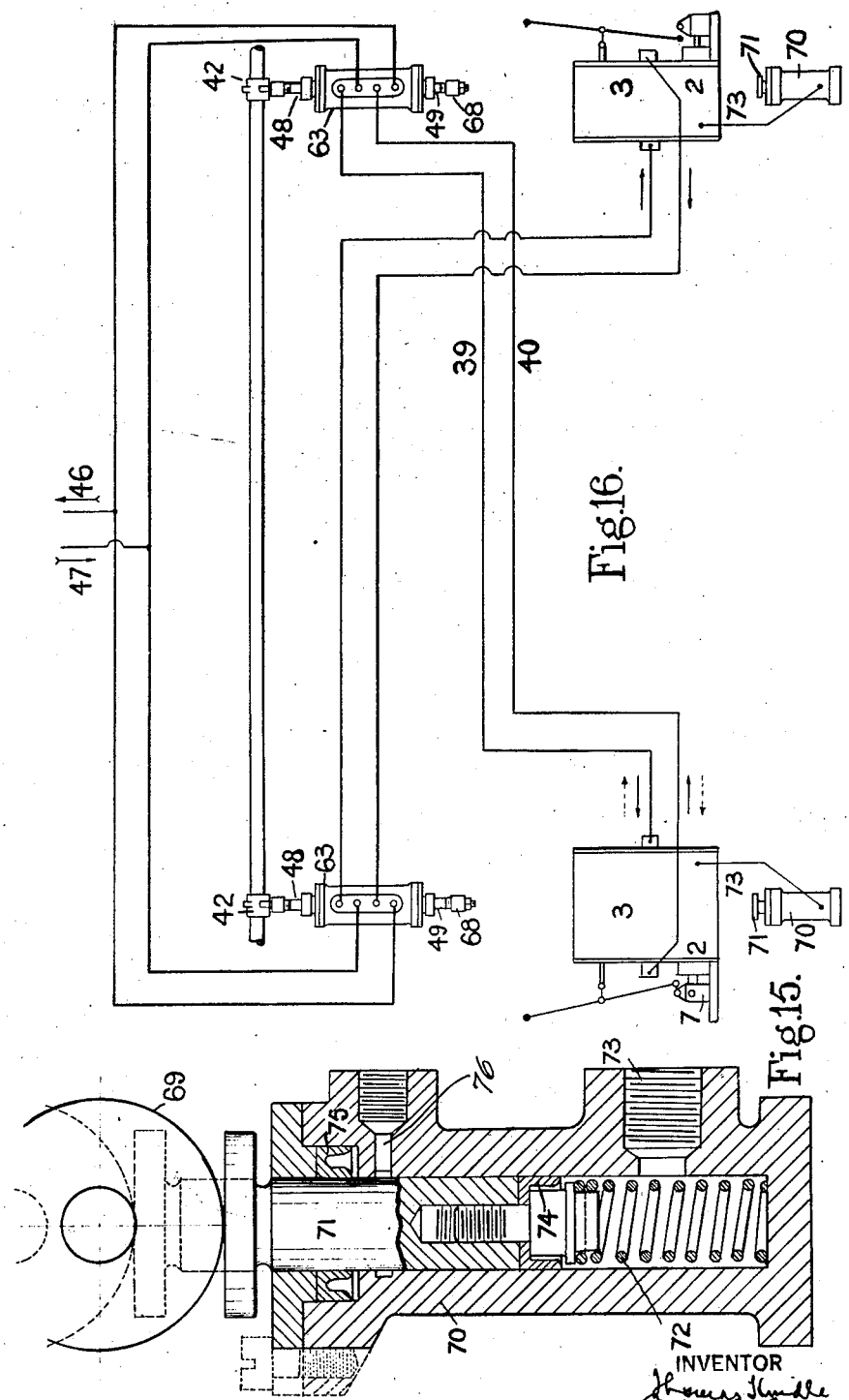

Patented Nov. 25, 1947

2,431,642

UNITED STATES PATENT OFFICE 2,431,642

PICKING MECHANISM OF LOOMS FOR WEAVING

Thomas Hindle, Blackburn, England

Application November 14, 1945, Serial No. 628,550
In Great Britain November 24, 1944

11 Claims. (Cl. 139—146)

1

This invention relates to improvements in the picking mechanism of looms for weaving.

The main object of the invention is to provide hydraulic means whereby the shuttle may be picked or propelled across the loom, and immediately following such picking impulse, the picker, picking stick and connected parts may be progressively retarded and brought to rest, and thereafter returned to their initial position, all with a minimum of mechanical shock, noise and wear and tear of the parts.

According to the invention each picking stick and picker is actuated by a double acting piston operated by piston valves adapted to admit fluid pressure alternately to each side of the piston under the control of a cam operated pick timing valve.

A further feature of the invention comprises the provision of means for controlling the operation of the pick timing valve to provide "pick at will" operation.

A still further feature of the invention is to provide means whereby the swell spring pressure may be relieved wholly or in part from the shuttle exactly coincident in time with the commencement of and during its acceleration and discharge.

The invention will be described with reference to the accompanying drawings.

2

Figure 1:
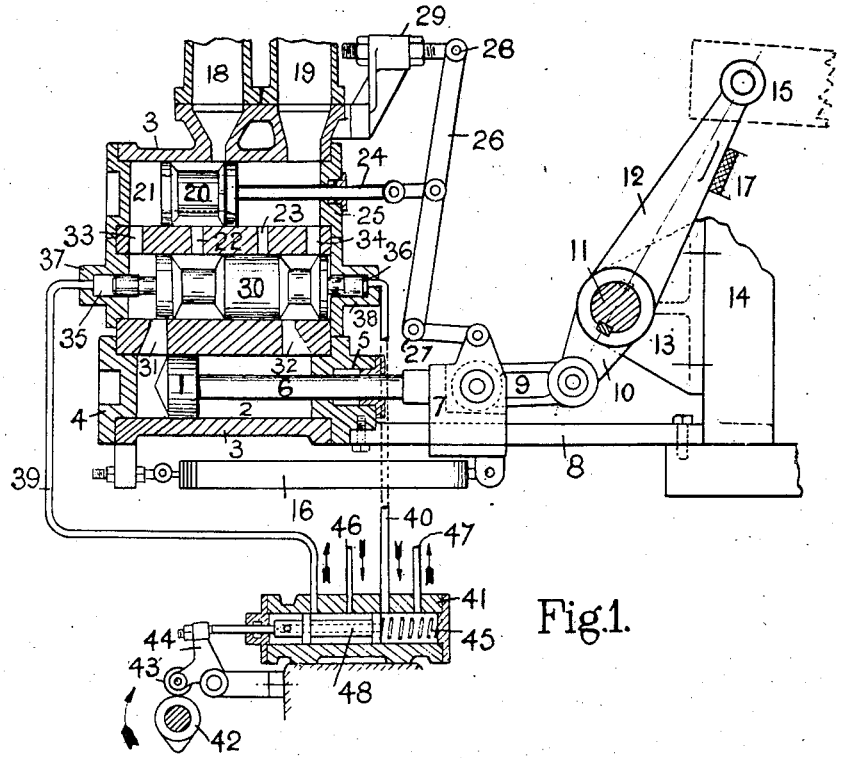
Fig. 1 is a sectional elevation of one form of the hydraulic or oil-operated picking mechanism for one end of a loom, and shows the mechanism at rest between successive picking operations.
Figure 6:
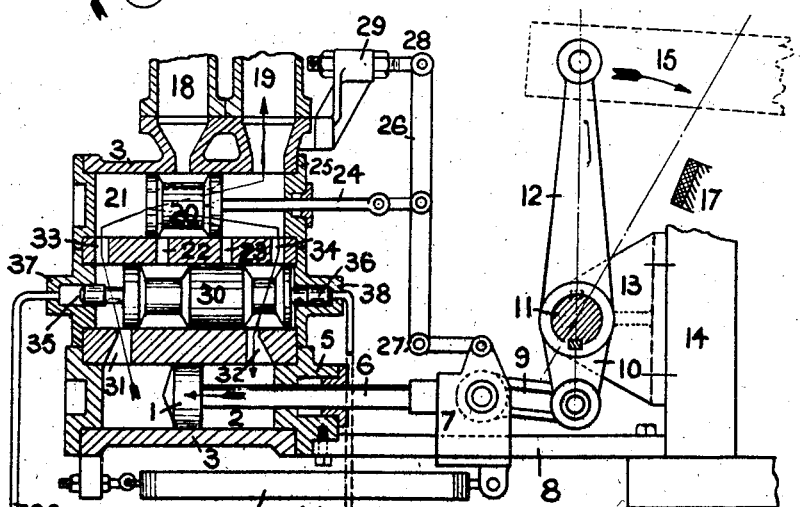

Fig. 6 is a similar view showing the initiation and course of the spring-actuated return stroke to the initial position of Fig. 1.

Fig. 7a to Fig. 7e show the construction of the cylinder block, and the arrangement of the ports including those controlled by the control valve and shuttle valve, also of the shuttle valve and its actuating pistons. Fig. 7c is a half section on line A—A a half section on line B—B and a half section on line C—C of Fig. 7b.

Figure 8:
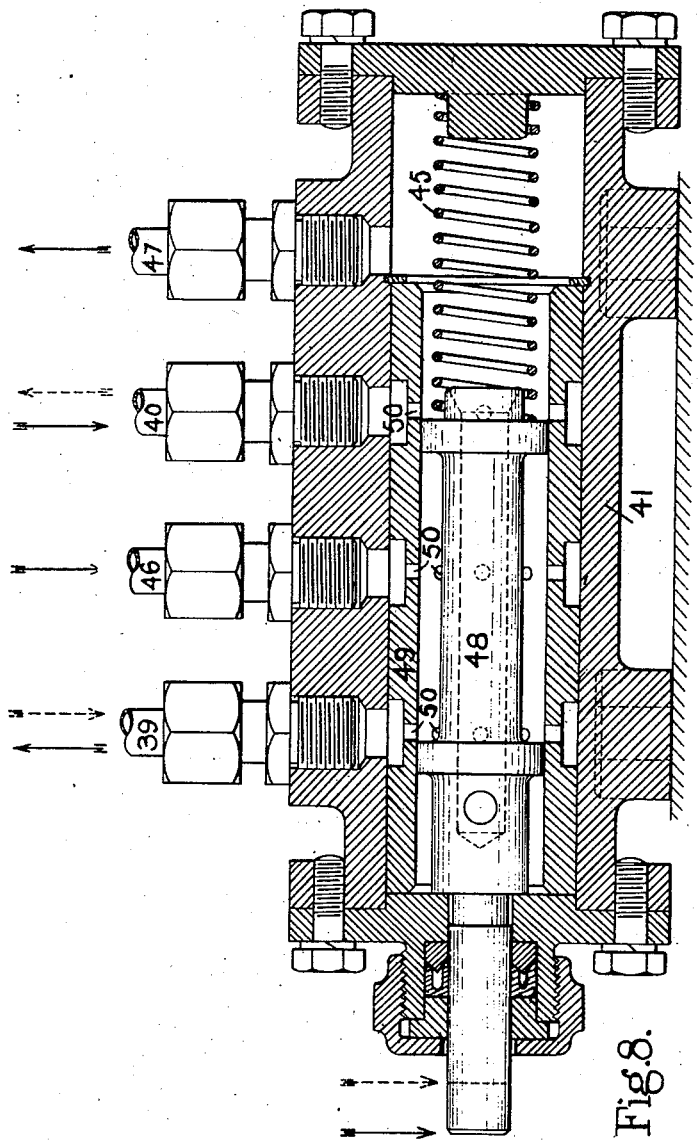

Fig. 8 is a sectional elevation enlarged of the direct-acting pick timing valve, actuated by a timing cam to control the operation of the picking mechanism of Figs. 1 to 6.

Figure 9:
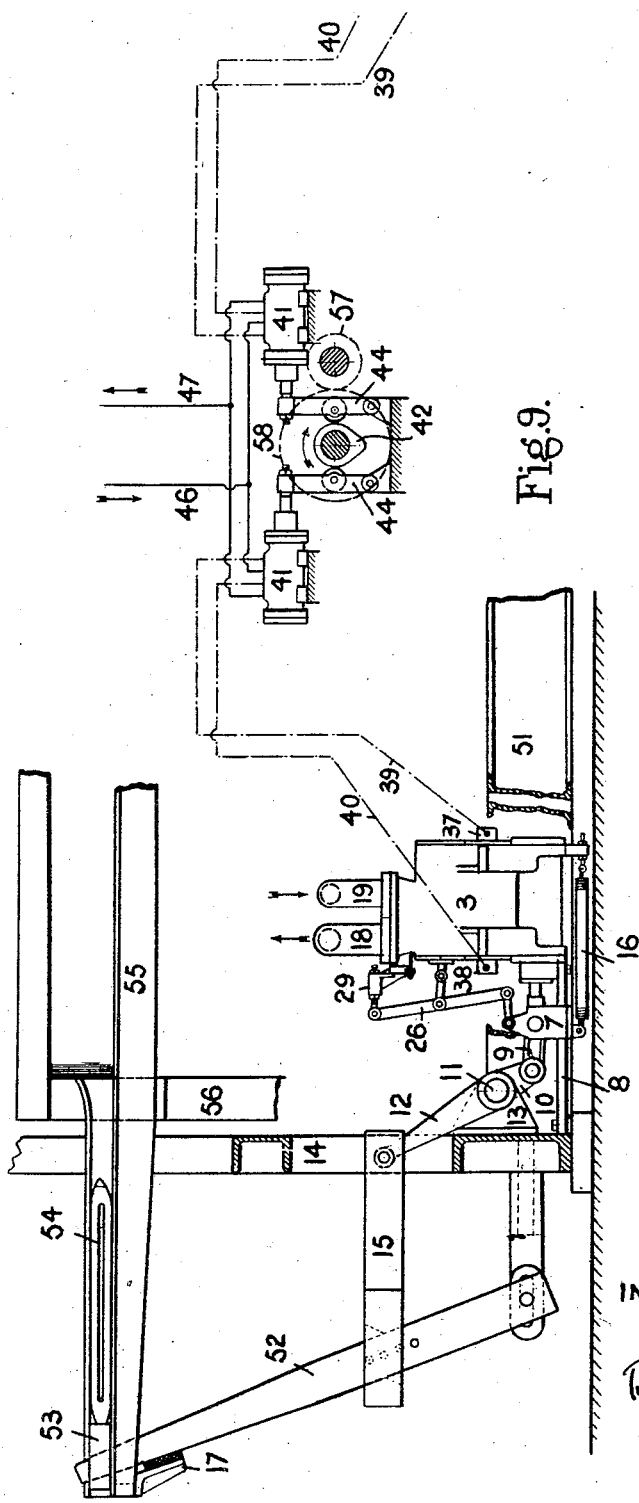

Fig. 9 is a front elevation (partly diagrammatic) of one end of a loom and shows the picking mechanism (including one method of conveying the impulse to the picking stick) and the actuation of two direct-acting pick timing valves, of the general form shown in Fig. 8, by a cam revolving at half the speed of the crankshaft (or its equivalent) thereby providing alternate picking, i. e. "pick and pick" sequence.

Fig. 10a is a front elevation partly in section of one method of actuating two direct-acting pick timing valves, of the general form shown in Fig. 8 from a pattern chain, thereby providing picking in any desired order, i. e. "pick at will" sequence.

Fig. 10b is a side elevation of same.

Fig. 10c is a plan of same.

Fig. 11 is a section of the conditional or "pick" or "miss" pick timing valve which is operated jointly by a timing cam and some other agent such as a pattern chain or the shuttle box swells.

Figs. 12a to 12d are diagrammatic sectional elevations illustrating the action of the conditional or "pick" or "miss pick" timing valve shown in Fig. 11.

Figs. 13a and 13b show side view and front view respectively of one method of actuating two conditional pick timing valves, of the general form shown in Fig. 11, in accordance with a pattern chain, thereby providing picking in any desired order, i. e. "pick at will" sequence.

Figs. 14a, 14b and 14c show side elevation partly in section of a modification in which the "pick at will" sequence is automatically controlled by the shuttle box swells, in such a manner that an empty shuttle box at one end permits a pick from the opposite end, while a full shuttle box at one end prevents a pick from the opposite end. These figures also illustrate the operation of the swell release coincident with commencement of and during the shuttle's acceleration.

Fig. 15 is a section of the fluid actuated piston and cylinder which operates the swell release.

Fig. 16 is a schematic diagram showing the piping connections for the operational sequence illustrated in Figs. 14a, 14b, 14c and also the swell release.

Figs. 1 to 6 show the different positions assumed by a picking lever 12 operated by a double acting piston 1 reciprocating in a cylinder bore 2 formed in a cylinder block 3. The picking mechanism comprises automatic valve gear for regulating the flow of fluid (hereinafter referred to as "oil") to and from both sides of the double-acting piston 1. The ends of the cylinder bore 2 are closed by covers 4 and 5, the latter being provided with a gland or oil-seal for a piston rod, 6, which protrudes through the cover. The outer end of the piston rod 6 is formed into or attached to a cross-head 7 which is guided and supported by a slide bar 8. This cross-head 7 is connected by a link 9 to a short radius lever 10 keyed to an oscillating shaft 11, to which the longer radius picking lever 12 is also keyed. The shaft 11 is carried in suitable bearing 13 bolted to the loom frame 14. The picking lever 12 may be connected to the picking stick in any convenient manner as, for example, by a connector 15, which passes freely through an opening in the loom end frame 14, and is flexibly linked to the picking stick. A spring 16 acts to return the piston and crosshead to the left (in Fig 1) until the picking lever rests against a buffer 17.

Referring to Fig. 1 oil under pressure, preferably from an accumulator of the compressed-air loaded type (not shown) enters the cylinder block 3 through a port 18; and after doing work leaves by the port 19. Flow of oil into and out of the double-acting power cylinder 2 is controlled by two main valves 20 and 30, both of which are preferably of the sliding piston-type.

The first of these valves, herein referred to as the control valve 20, is arranged to reciprocate in a valve bore 21. This control valve is provided with two collars which are a close sliding fit in the valve bore and are separated by a waist of smaller diameter. Throughout the working stroke of the control valve 20 the port 18, by which oil enters the valve bore 21, remains in constant communication with the annular space between the two collars of the control valve 20. The control valve is preferably of hollow construction as shown to provide communication between the respective ends of the bore 21 (at each end of valve 20) and with the exhaust port 19. The two collars on the control valve are adapted to cover two ports 22 and 23 at a suitable position in the stroke of the valve 20.

Although the ports 22 and 23 and also ports 31, 32, 33 and 34 are shown for simplicity as entering directly into their respective cylinder bores each is of annular construction as shown in Figs. 7a to 7c to allow the oil to enter around the periphery of the pistons.

The control valve 20 is adapted for external operation by means of a valve rod 24 extending out through the cover 25 (which is provided with an oil seal) and flexibly linked to a stabilizing lever 26 approximately mid-way along its length, so that the stroke of the control valve is approximately half the stroke of the power piston. One end 27 of the stabilising lever is flexibly linked to the crosshead 7 (or any other convenient part of the mechanism moving in synchronism with the power piston, as for example the levers 10 and 12), so as to swing in synchronism with the reciprocating piston 1, while the other end of the stabilising lever is pivoted to a fixed anchorage 28, which is provided with screw adjustment 29 as a means of regulating the power of the picking impulse. As shown in Fig. 1, the control valve 20 has been carried back to the left so that the ports 22 and 23 are exposed and therefore open, and the valve must travel an appreciable distance to the right before its collars commence to cover these two ports.

The second of the two valves hereinbefore referred to as controlling the flow of oil into and out of the double-acting power cylinder 2, and herein referred to as the shuttle valve 30, is of the shuttle or pressure-shot type, and may be in one of two positions. In the first or "closed" position, in which it is shown in Fig. 1, oil under pressure from the annular waist of the control valve 20 and passing through the port 22 is prevented by the shuttle valve 30 from entering either end of the power cylinder 2; and, furthermore, both ends of the cylinder are connected, via the main cylinder ports 31 and 32 and via the shuttle valve controlled ports 33 and 34, to each other through the hollow control valve 20, and also to the exhaust port. As will be apparent from Fig. 1 (and Fig. 9) the picking sticks and pickers, when at rest in their outer positions and with the loom stopped, may be freely moved by hand along their operating paths for examination, without restriction caused by oil pressure on either side of the piston 1. The return spring 16 suffices to return the stick and its connected parts to their initial positions (shown in Figs. 1 and 9) after such manual displacement.

In its second or "open" position, the shuttle valve 30 provides full bore continuity of the two ports 22 and 23 to the two main ports 31 and 32 respectively leading to the ends of the power cylinder, as will be shown in subsequent reference to Figs. 2 to 5 of the drawings.

Referring to Fig. 7d the extreme ends of the shuttle valve 30 are formed into pistons 35 and 36 which slide in cylinders 37 and 38 respectively formed in the end covers for the shuttle valve bore. Oil pressure may be applied to or released from these pistons by pipe connections 39 and 40, thereby shooting the shuttle valve 30 from one position to the other as and when appropriate.

Flow of oil to and from the actuating pistons 35 and 36 of the shuttle valve and, therefore, the position occupied by the shuttle valve, is controlled by a separate auxiliary valve, herein referred to as the pick timing valve, one form of which is shown at 41. This timing valve 41 is under continuous control of and subject to displacement by a control or timing cam 42. As shown in Fig. 1, the roller 43 mounted on a follower lever 44 is engaging the cam 42 on its dwell, and a spring 45 is holding the timing valve in such position that of the two pistons 35 and 36 only 35 is subject to oil pressure, which therefore forcibly retains the shuttle valve in its "closed" position, so that no action can occur so long as the roller 43 remains on the cam dwell. Oil for actuating pistons 35 and 36 enters the timing valve body 41 by a pipe 46 and leaves by an exhaust pipe 47.

Figure 2:
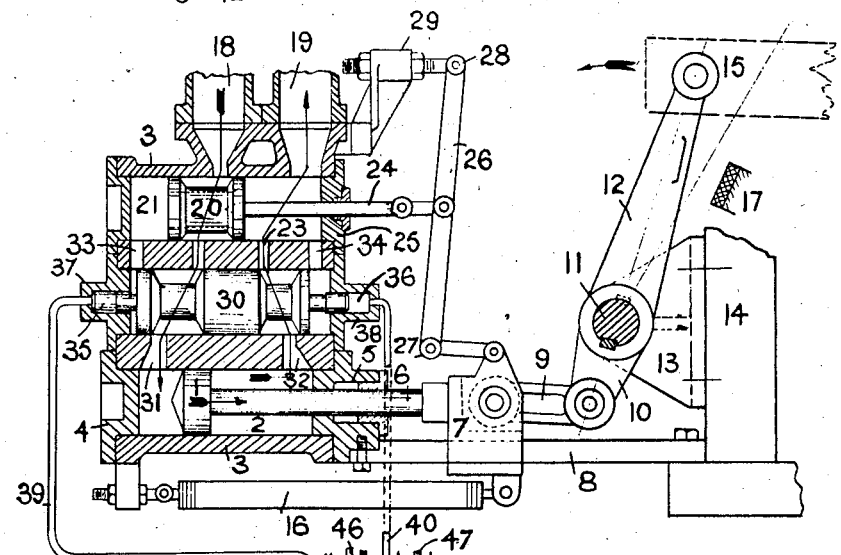
Fig. 2 is a similar view to Fig. 1 showing the initiation and commencement of the picking impulse under control of a timing cam.

Referring to Fig. 2 which illustrates the initiation and commencement of the picking impulse, the timing cam 42 has revolved until the lobe of the cam 42 has displaced the roller 43 and through the follower lever 44 has displaced the timing valve 48 to such extent that the direction of oil flow in the pipes 39 and 40 has been reversed, with the effect that oil pressure applied to the piston 36 and released from the piston 35 has caused the shuttle valve 30 to be shot over (to the left in Fig. 2) into its "open" position in which it is shown in Figs. 2 to 5 of the drawings.

As an immediate result thereof, oil under pressure entering through the port 18 passes freely around the annular waist of the control valve 20, through the open port 22 and around an annular waist of the shuttle valve 30 to the port 31 to enter the left end of the power cylinder 2. At the same time, waste oil from the right end of the cylinder leaves freely through the port 32, around annular waist of the shuttle valve 30 to the port 23, and thence to the main exhaust port 19.

Due to the resultant unbalanced oil pressure acting on the left end of the power piston, in Fig. 2, this latter is at once displaced and very rapidly accelerated. In its displacement in the manner described, the piston carries with it the connected levers 10 and 12, together with the picking stick, picker and shuttle, which latter, due to the ratio of the respective displacement of the picker and piston, readily attain the high velocity necessary for the flight of the shuttle across the loom.

Figure 3:
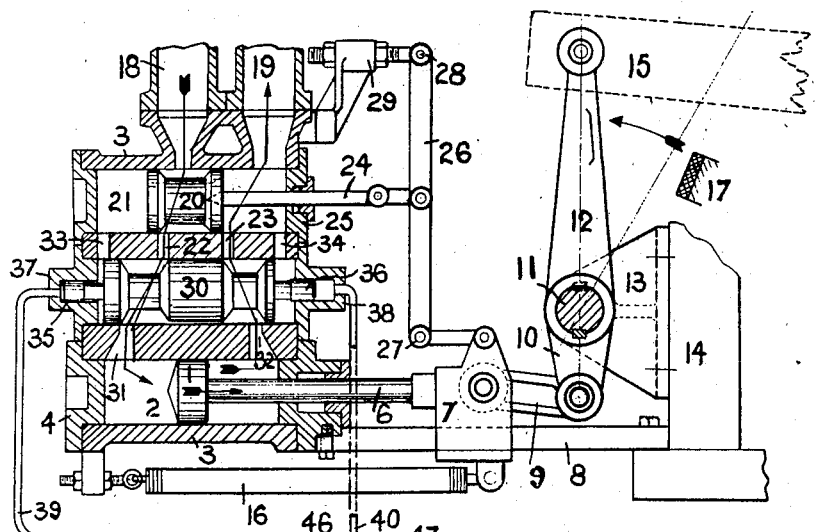
Fig. 3 is a similar view showing the mechanism at the stage at which maximum picking velocity is attained.

As the piston makes its picking stroke under oil pressure, it also acts, through the stabilising lever 26, to carry the control valve 20 in the same direction as the piston is moving, so that at a certain stage in the power stroke of the piston, the control valve 20 reaches a position in which its further movement will cause restriction of the ports 22 and 23. Fig. 3 shows this position, at which stage, or very shortly afterwards, maximum velocity is attained.

The power of the pick, or in other words, the maximum picking velocity attained, depends upon the linear displacement of the control valve 20 before it commences to restrict ports 22 and 23. This limiting displacement may be varied by the screw adjustment 29 which changes the otherwise fixed pivotal position 28 at the top end of the stablising lever 26. Referring to Fig. 1, movement of pivot 28 to the right, for example, will also carry the control valve 20 to the right nearer the ports 22 and 23, which such adjustment does not affect the initial position of the power piston 1, so that their relative positions in the cylinder block are changed, with the result that the control valve commences to restrict the ports 22 and 23 earlier in the stroke of the piston, so reducing the power and maximum velocity. Alternatively, means and adjustment, with similar effect, may be provided at the valve rod 24 or in its linkage to the stabilising lever 26, or again at the bottom end of the stabilising lever where it is linked to the crosshead 7.

The power of the picking impulse is also dependent upon the oil pressure, which may be regulated in any convenient manner (not shown).

Further movement of the power piston carries the control valve further to the right than shown in Fig. 3, thereby creating increasing restriction at the ports 22 and 23 and throttling of the oil flowing in and out through them, as a result of which the piston at once commences to lose velocity. At this stage, the accelerated shuttle leaves the picker and proceeds on its flight to the other end of the loom.

Figure 4:
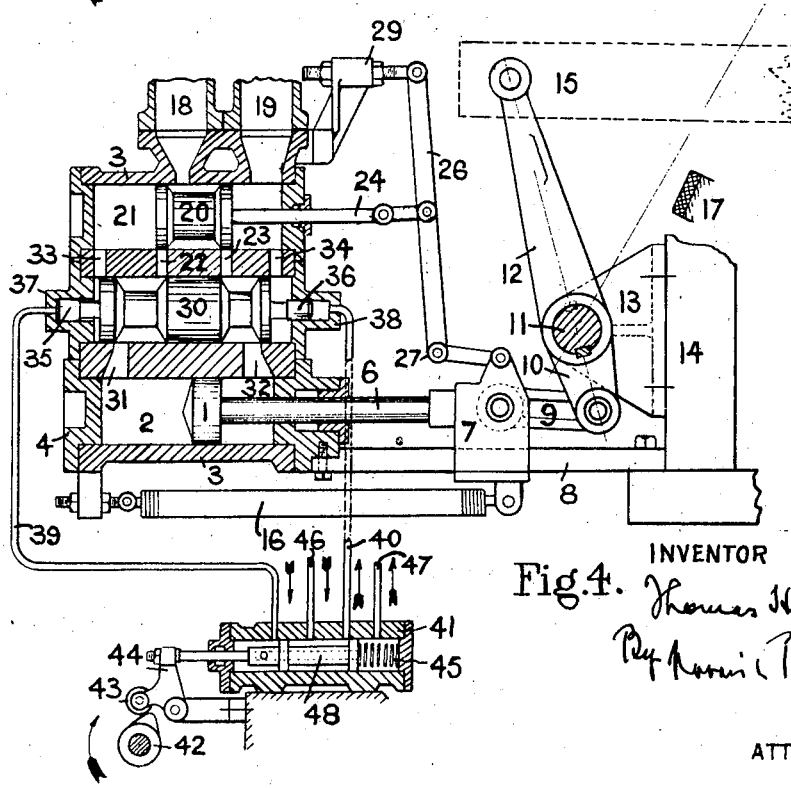
Fig. 4 is a similar view showing the picking mechanism in its stabilised position, which it assumes immediately upon completion of the picking impulse.
Figure 5:
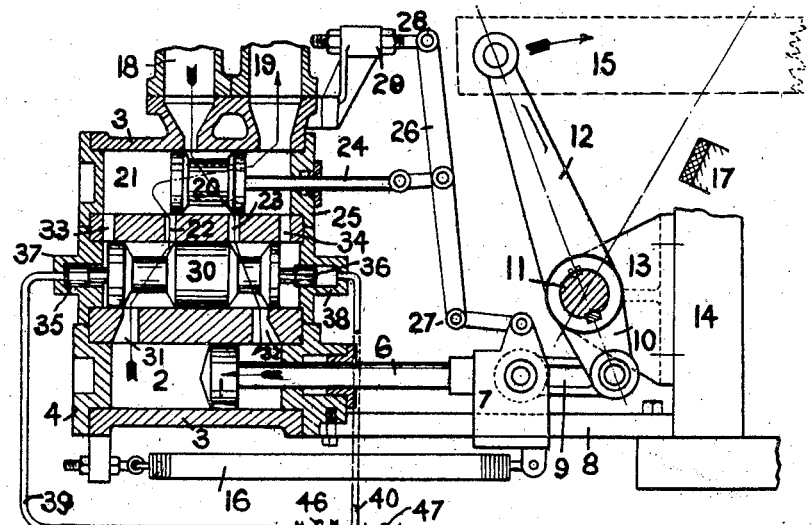
Fig. 5 is a similar view showing the effect of the mechanism over-running the stabilised position of Fig. 4, in which event fluid pressure acts to arrest the further movement of the piston and to return it to the stabilised position in preparation for the return stroke.

As the oil flow is increasingly throttled in the manner described, the piston and its connected parts are subject to progressive retardation, until finally they are brought to rest with the piston about three-quarters way along the cylinder and the control valve in its stabilised position in which its two collars just cover or slightly more than cover the two ports 22 and 23, as shown in Fig. 4. Any tendency for the piston and control valve to over-run this stabilised position (which may be caused by the use of abnormally heavy picking stick and/or pickers) is effectively countered as shown in Fig. 5, which illustrated that the effect of such over-run is to carry the control valve 20 to the right beyond the stabilised position and to reexpose the ports 22 and 23 with the result that oil pressure from the accumulator via port 18 is applied to the right hand end of the piston, while simultaneously the left hand end is connected to the exhaust port 19 whereby the over-run of the piston is very promptly arrested, whereupon it and its connected parts are returned to the stabilised position shown in Fig. 4.

At this stage, or very shortly afterwards, referring to Fig. 6, the roller 43 returns to the dwell of the timing cam 42, whereupon the timing valve 48 reverts, by reason of the spring 45, to its initial or rest position, in which oil pressure is released from the piston 36 and applied to the piston 35 with the result that the shuttle valve 30 is at once shot into its "closed" position. Both ends of the power cylinder being thereby connected to one another and to the exhaust port 19, the spring 16 acts to return the piston and its connected parts to their initial positions shown in Fig. 1, in which they remain until another pick is required from the same end of the loom.

As the piston is required to attain a velocity of about 5 to 7 feet per second, and it is desirable that the corresponding oil velocity through the ports shall not appreciably exceed 12 feet per second, the ports subject to oil-flow during the piston's acceleration require a cross-sectional area approximately equal to one-half of the piston's area. The ports are indicated diagrammatically in Figs. 1 to 6 to illustrate the operational sequence, but as shown in Figs. 7b and 7c, the main ports extend almost completely around the circumference of the tunnels or bores in which the control valve and the shuttle valve, respectively, are arranged to slide, and are connected (externally to the said tunnels) by passages having the specified cross-sectional area, which passages, in the example illustrated are cored in the cylinder block, as shown in the cross-sections included in Fig. 7c. Fig. 7a shows an end elevation of the cylinder block, and the arrangement of the end ports 33 and 34 is shown by dotted lines. These ports may be of relatively smaller area as shown because they are in use only during the spring actuated return stroke of Fig. 6, or when the picker and stick are moved by hand along their operational paths.

Referring to Fig. 7d, the collar 78 on the shuttle valve has an axial length greater than the axial length of the port 31 where this opens into the shuttle valve bore, so that when the shuttle valve 30 is shooting over from its closed to its open position (shown by Fig. 2), the collar 78 in sliding to the left cuts off communication between cylinder port 31 and the end port 33 before placing the cylinder port 31 in communication with port 22, whereby leakage of pressure oil via port 22, in and out of port 31 and thence to port 33 and to exhaust in the course of the shuttle valve changing over to its open position, is avoided.

Referring to Figs. 1 and 6, the collar 78 partly (about two-thirds) covers port 31 when the shuttle valve is in its closed position, but the area of such port then remaining uncovered is approximately equal to the area of end port 33 and is adequate for the low velocity spring-actuated return stroke as already described.

In the cycle of operations illustrated by and described in reference to Figs. 1 to 6, the mechanism will pick once for each revolution of the timing cam. The mechanism may, however, be suitably controlled as hereinafter described for either "pick and pick" or "pick at will" picking sequence.

Fig. 8 shows to larger scale the general construction of the direct acting pick timing valve 41, by which the shuttle valve 30 may be actuated as already described. The valve is of the piston type and is a close sliding fit in a stationary sleeve 49, which is provided with ports 50 leading to pipe connections 39, 40, 46 and 47. The piston valve is hollow to provide exhaust communication.

The valve 48 may be positively actuated in both directions, but the positive actuation in one direction with return by the spring 45 is generally more convenient in application. When at rest as shown in Fig. 8, the direction of oil flow in pipes 39 and 40 is shown by the solid arrows, while the dotted arrows indicate the reversed direction of oil flow when the valve is displaced to the right.

Referring to Fig. 9 which shows the picking mechanism for one end of a loom, the cylinder block 3 is mounted on the loom base rails 51, which are shown broken away to disclose the mechanism. The picking stick 52 is linked by the connector 15 to the picking lever 12. The picker 53 engages the stick and the shuttle 54 in the usual manner. The swell is omitted to expose the shuttle. One end sword 56 is indicated supporting the slay 55.

The timing cam 42 in this example revolves at half the speed of the crankshaft (or its equivalent) due to two to one reduction gears 57 and 58. The cam displaces the two follower levers 44 and operates the pick timing valves 41 in turn, thereby providing alternate picking, i. e. "pick and pick." Alternatively, the two timing valves 41 may be actuated by two entirely separate cams, provided that the valves are alternately moved into their "pick" positions once in two revolutions of the crankshaft.

Referring to Figs 10a–10c in a modification the direct-acting pick timing valves of Figs 8 and 9 are actuated by a single cam 42 revolving at crankshaft speed to provide "pick at will" sequence as defined by a pattern chain 59. The cam 42 is free to slide on its driving shaft, and may be moved endways by a lever 60, so as to present the single cam lobe to either of the follower levers 44 and so actuate either of the two pick timing valves 41, but only one at once. A roller on the pattern chain 59 raises the faller 61, while a blank or tube allows it to fall under the action of gravity aided by a spring 62. The faller lever 61 is connected in any convenient manner to the lever 60, so as to control the picking sequence in any pre-determined order.

Fig. 11 shows a modified construction of pick timing valve 63, in which both the piston-valve 48 and its sleeve 49 are adapted for external operation mechanically independent of each other.

In this form the return spring 45 is common to both valve and sleeve.

The action of this combined valve is shown in Figs. 12a to 12d. Referring to Fig. 12a both the valve and sleeve are in their outer or "miss" positions, and when suitably connected to the shuttle valve actuating cylinders 36 and 37, the shuttle valve will be retained in its "closed" position. In Fig. 12b, the valve 48 has been moved in to its "pick" position, but because the sleeve 49 remains stationary in its outer or "miss" position, the direction of oil flow is unchanged. In Fig. 12c the sleeve has been moved in to its "pick" position, but the direction of oil flow is unchanged so long as the valve 48 remains in its outer or "miss" position. In Fig. 12d, however, both valve 48 and sleeve 49 have been moved in to their "pick" positions, and only in this particular case is the direction of oil flow reversed, thereby causing the shuttle valve to shoot into its "open" position to initiate a picking impulse.

This modified valve provides, therefore, a conditional but accurately timed control of the picking mechanism hereinbefore described. The piston valve 48 may be actuated by a timing cam running at crankshaft speed, so that the valve is moved into its "pick" position once during each revolution of the crankshaft, nevertheless the pick will only occur if the sleeve 49 is moved into its "pick" position concurrently by some separate controling means, with that particular object.

One method of applying the conditional pick timing valve of Fig. 11 so as to provide "pick at will" sequence is illustrated by Figs. 13a and 13b. Two such valves 63 are actuated as to their piston valves 48 by the timing cams 42 revolving at crankshaft speed, and as to their sleeves 49 by the fallers 61 in accordance with the pattern chain 59, so as to depress or move in one sleeve or the other in the maner shown. As one faller must invariably be down when the other is up, each chain link pin necessarily carries a roller and a blank or tube.

Another and preferred method of applying the conditional pick timing valve of Fig. 11 to provide "pick at will" sequence is to control the order of picking by the shuttle box swells, in such a manner that if the shuttle box be empty at one end of the loom so that its swell is displaced inwardly, the picking mechanism at the other end will pick in a normal manner, but on the other hand, if the shuttle box at one end contains a shuttle, so that its swell is displaced outwardly, the picking mechanism at the other end will remain inoperative.

Referring to Figs. 14a–14c, the slay 55 is shown in its forward position and is supported on swords 56 (indicated by dotted lines). The box contains a shuttle 54, as a result of which the swell 64 is displaced outwardly and carries with it a swell bell-crank lever 66, which is provided with an adjustable stop screw 77 just clear of the underside of the slay when the shuttle is in the box. The swell lever is connected by link 67 to a rocking lever 68 which is pivoted so that its forward eye coincides as accurately as possible with the sword pivot centre. The spring 62' applies pressure to the swell through the intermediary of the lever 68, link 67 and swell lever 66. Due to the presence of the shuttle the link 67 is raised, so lifting the front arm of lever 68 while depressing its rear arm, which is adapted to control the position of the sleeve 49 in the conditional pick timing valve 63, which sleeve, therefore, is retained by the internal spring 45 in its "miss"

position. The timing cam 42 running at crankshaft speed actuates the piston valve 48 every crankshaft revolution, but with effective action only when the sleeve 49 is in its operative or "pick" position. The timing valve 63 controls the picking mechanism at the other end of the loom, from which no pick is required, which result is achieved by the action of the swell lever in retaining sleeve 49 in its "miss" position.

As shown in Fig. 14b in which the slay has swung back to the picking position, although the timing cam 42 has depressed the piston valve 48, the mechanism at the other end of the loom will remain inoperative because the sleeve 49 remains in its "miss" position.

In Fig. 14c, the slay is similarly in the picking position but in this case the shuttle box is empty, so enabling swell spring 62' to displace the swell inwardly until it bears against the swell stop 65, in consequence of which the rear arm of the lever 68 is raised and the sleeve 49 carried into its "pick" position. As the piston valve 48 is duly depressed into its "pick" position by the timing cam 42, a pick will occur from the opposite end of the loom, so despatching a shuttle to that end where there is an empty box to receive it.

If both boxes at the same time contain a shuttle, then both picking mechanisms remain inoperative. If both boxes are empty at the same time, both mechanisms will pick simultaneously, but without harmful result.

In combination with the hydraulic picking mechanisms herein illustrated and described, the pressure of the spring loaded swell on the boxed shuttle may be relieved, wholly or in part, exactly coincident in time with the commencement of the shuttle's acceleration, thereby reducing the load imposed on the picking stick and associated components, including the picker, and prolonging their useful life.

Fig. 15 is a section of the oil-actuated piston and cylinder employed for this purpose. The swell release cylinder 70 is provided with a plunger piston 71, which at its outer end has a mushroom head to engage a roller 69 pivoted on the clevis pin at the foot of link 67 in Fig. 13. The inner end of the piston is fitted with a cup seal 74, and the cylinder neck is fitted with a U-seal 75. A spring 72 acts on the piston 71 to maintain its mushroom head continually in contact with the roller 69, thereby avoiding back-lash and ensuring that the cylinder 70 is constantly full of oil, which enters under the exhaust head from the picking cylinder. An exhaust port 76 is used to return to the sump any oil leaking past the cup-seal 74. Oil is admitted to the cylinder through a port 73 which is connected to the pressure or power end of the picking cylinder 2 as indicated in Fig. 16, with the effect that when pressure oil is admitted to the picking cylinder 2, to develop a picking impulse, such oil pressure is also and simultaneously applied to the piston 71, thereby ensuring that the swell pressure is relieved from the shuttle exactly coincident with commencement of the picking impulse.

Referring to Fig. 14b, which illustrates the period during which the shuttle 54 is being accelerated, the swell release cylinder 70 is simultaneously energised because of its connection in parallel to the picking mechanism at the same end of the loom. The piston 71 has raised the link 67 against the resistance of the spring 62 to the limit imposed by the stop screw 77, which is bearing against the underside of the slay, causing the swell lever to withdraw clear of the swell thereby relieving it of the pressure otherwise imposed by spring 62.

Referring to Figs. 14a and 14c, depression of the piston 71 when the cylinder 70 is de-energized offers negligible resistance, but the internal spring 72 acts to keep the piston in contact with roller 69 in such circumstances. The spring 62' is amply powerful to overcome the spring 72 and the spring 45, and to close the swell into the empty box as shown in Fig. 14c.

Fig. 16 shows the piping connections for control of the picking mechanisms and picking sequence by the shuttle box swells as illustrated and described with reference to Figs. 4a, 4b and 4c. As shown, the conditional pick timing valve 63 on the left of Fig. 16 is inoperative because its lever 68 is depressed and its sleeve 49 is in its "miss" position, whereby no pick can occur from the picking mechanism on the right. On the other hand, the other timing valve on the right is operative because its lever 68 is raised and its sleeve 49 is in its "pick" position, whereby a pick will occur from the picking mechanism on the left.

Fig. 16 shows the connection of the swell release cylinders 70 in parallel with the power or picking cylinders at the same ends of the loom. Alternatively, the swell release cylinders may be connected to any other point in the piping connections suitable for energising the said cylinders alternately and in close syncronism with the picking impulse at the same end of the loom. It will be understood that the oil-actuated swell release may be applied in combination with the hydraulic picking mechanism herein described to a loom having the picking sequence controlled in any suitable manner, and is in no respect limited to the particular arrangement shown in Figs. 14 and 16.

In a modification as shown in Fig. 7e, the shuttle valve actuating pistons 35 and 36 are made of different diameters so that the area of one piston is approximately twice the area of the other. The smaller piston, which is perferably 35, is subject to continuous oil pressure by its cylinder 37 being connected permanently to main oil supply port 18, or to any other steady source of pressure, whereby the shuttle valve is retained in one position, preferably its "closed" position as in Fig. 1. Flow of oil to and from the other and larger piston, which when energised readily overpowers the smaller piston, is controlled by the pick timing valves already described, with the sole modification that the pipe connection 39 from those valves is eliminated.

Referring to Figs. 11 and 12, the respective actions of the valve 48 and sleeve 49 as particularly described hereinbefore may be actuated by the timing cam and the valve by the shuttle box swells or in accordance with a pattern chain.

I claim:

1. Hydraulically operated picking mechanism for looms for weaving comprising a cylinder block, a reciprocating double acting power piston therein, means for multiplying the movement of the piston and conveying it mechanically, a picking stick operated by the power piston and two piston valves (a control valve and a shuttle valve) controlling the flow of fluid into and out of the ends of the cylinder, the control valve being actuated externally, a stabilising lever connected approximately half way along its length to the control valve, a stationary fulcrum for the upper end of the stabilising lever the lower end of which is connected to and oscillated by the piston whereby the working stroke of the control valve is approximately half that of the piston both moving together and in the same direction, the said control valve regulating the flow of pressure and exhaust fluid respectively through two ports leading from the control valve bore to the respective ends of the cylinder, such fluid flow being further subject to over-riding control by the shuttle valve of the pressure shot type which in one of its two positions connects both ends of the cylinder together and to exhaust and in the other position provides full bore continuity between the two ports controlled by the control valve and their respective ends of the cylinder to allow fluid to enter one end of the cylinder to propel and accelerate the piston in its picking impulse during which exhaust fluid is freely expelled from the other end of the cylinder, such impulsive stroke of the piston proceeding until its movement displaces the control valve sufficiently to restrict and finally to cover its ports and so restrict and finally arrest the parallel flow of fluid into and out of the cylinder, in the course of which restriction and closure the piston and control valve are retarded and brought to rest and held stationary in a stabilised condition by reason of the fluid sealed off by the control valve in both ends of the cylinder, means by which the shuttle valve is returned to its alternative position in which further flow of pressure fluid into the cylinder is prevented, while at the same time the oil previously sealed off by the control valve in both ends of the cylinder is released to exhaust, a spring by which the piston and control valve are returned to their initial positions, a timing cam driven by the loom and a pick timing valve operated by the cam to control the admission of fluid pressure to the cylinder.

2. Hydraulically operated picking mechanism for looms for weaving as in claim 1, having a screw adjustment for varying the initial position of the control valve in relation to the two ports it controls and to the initial position of the power piston.

3. Hydraulically operated picking mechanism for looms for weaving as in claim 1 having two pistons on the pressure shot shuttle valve which is controlled and actuated by the pick timing valve of the piston valve type, a spring for retaining the timing valve in its normal position, the timing valve when in its normal position acting to control the admission of fluid to one shuttle valve piston and at the same time to release fluid pressure from the other piston in such manner that the picking mechanism under control remains in operation and in its "pick" position into which the pick timing valve is displaced by the timing cam through acting to change over the connections to the two pistons whereby the shuttle valve is promptly but temporarily shot over to its operative position to initiate a picking impulse accurately timed in relation to the uniform rotation of the cam.

4. Hydraulically operated picking mechanism for looms for weaving as in claim 1, wherein two direct acting pick timing valves are employed, a timing cam rotating at half the speed of the loom and means for actuating the two timing valves at equal intervals of time thereby providing pick and pick picking sequence.

5. Hydraulically operated picking mechanism for looms for weaving as in claim 1, wherein two direct acting pick timing valves are employed, a timing cam rotating at half the speed of the loom, a timing shaft upon which the cam is slidably mounted and a pattern chain for controlling the picking order adapted to actuate either valve at similar points in its revolution thereby providing pick at will picking sequence.

6. Hydraulically operated picking mechanism for looms for weaving as in claim 1, wherein the shuttle valve has actuating pistons and is controlled by the pick timing valve comprising a valve of the piston valve type and a concentric valve of the sleeve valve type arranged outside the piston valve, a cam for operating the piston valve, means for operating the sleeve valve, and a spring for retaining the valves in their normal miss positions in which they act to control the admission of pressure fluid to one shuttle valve actuating piston and at the same time release fluid pressure from the other shuttle valve actuating piston to render the picking mechanism inoperative, but which when the valve and sleeve are both in their operative positions, into which one of them is temporarily displaced by the timing cam revolving at crankshaft speed while the other is conditionally and temporarily displaced by the operating means, act together to change over the connections to the two pistons, whereby the shuttle valve is promptly but temporarily shot over to its operative position, thereby initiating a picking impulse.

7. Hydraulically operated picking mechanism for looms for weaving as in claim 1, wherein two conditional pick timing valves are employed, one for each side of the loom, each conditional timing valve comprising a piston valve and concentric sleeve valve, a timing cam rotating at the speed of the loom to control the piston valves, levers controlling the sleeve valves, a pattern chain operating the levers, and links on the pattern chain whereby only one sleeve valve is in its operative position at one time thereby providing pick at will sequence.

8. Hydraulically operated picking mechanism for looms for weaving as in claim 1, wherein the shuttle valve is actuated and controlled by the pick timing valve comprising a valve of the piston valve type and a concentric valve of the sleeve valve type arranged outside the piston valve a cam for operating the piston valves, two shuttle boxes, a shuttle box swell in each box, means connecting one sleeve valve to one shuttle box swell and the other sleeve valve to the second shuttle box swell whereby if a box is empty the swell is displaced into the box and displaces the sleeve valve connected thereto to initiate a pick from the opposite side of the loom while if the other box is full the swell is displaced outwardly and retains the sleeve valve connected thereto in its inoperative position so that no pick will occur from this side of the loom.

9. Hydraulically operated picking mechanism for looms for weaving as in claim 1, in combination with two shuttle boxes a shuttle box swell in each box and means for releasing the shuttle box swell coincidently with the opening of pressure to the power piston.

10. Hydraulically operated picking mechanism for looms for weaving as in claim 1, in combination with two shuttle boxes a shuttle box swell in each box, a swell release cylinder, a piston, a cylinder in which the piston slides this cylinder being connected in parallel with the power cylinder whereby the swell release cylinder will be energised, coincidently with the picking impulse at the same end of the loom.

11. Hydraulically operated picking mechanism for looms for weaving as in claim 1, in combination with two shuttle boxes a shuttle box swell in each box, a swell lever connected to each swell, a link connected to each swell lever, a roller carried by the link, a piston, a mushroom head on the piston and a spring to maintain the mushroom head in contact with the roller, a cylinder in which the piston slides this cylinder being connected in parallel with the power cylinder whereby the swell release cylinder will be energised coincidently with the picking impulse at the same end of the loom.

THOMAS HINDLE.

REFERENCES CITED

The following references are of record in the file of this patent:

UNITED STATES PATENTS

| Number | Name | Date |
| --- | --- | --- |
| 795,731 | Patterson | June 25, 1905 |
| 924,886 | Burrows | June 15, 1909 |
| 1,006,228 | Kirkus | Oct. 17, 1911 |
| 1,880,183 | Wilson | Sept. 27, 1932 |
| 1,963,473 | Richter | June 19, 1934 |
| 2,377,800 | Mascarenhas | June 5, 1945 |

FOREIGN PATENTS

| Number | Country | Date |
| --- | --- | --- |
| 1,209 | Great Britain | 1853 |